US012401117B2

(12) United States Patent
Li et al.

(10) Patent No.: US 12,401,117 B2
(45) Date of Patent: Aug. 26, 2025

(54) ANTENNA UNIT, ANTENNA MODULE AND BASE STATION HAVING THE SAME

(71) Applicant: Telefonaktiebolaget LM Ericsson (publ), Stockholm (SE)

(72) Inventors: Junming Li, Beijing (CN); Jin Pu, Beijing (CN); Xueyuan Zhang, Beijing (CN); Tao Huang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 437 days.

(21) Appl. No.: 17/788,404

(22) PCT Filed: Dec. 26, 2019

(86) PCT No.: PCT/CN2019/128767
§ 371 (c)(1),
(2) Date: Jun. 23, 2022

(87) PCT Pub. No.: WO2021/128182
PCT Pub. Date: Jul. 1, 2021

(65) Prior Publication Data
US 2023/0035473 A1 Feb. 2, 2023

(51) Int. Cl.
*H01Q 19/10* (2006.01)
*H01Q 1/24* (2006.01)
*H01Q 1/52* (2006.01)

(52) U.S. Cl.
CPC ............ *H01Q 1/526* (2013.01); *H01Q 1/246* (2013.01); *H01Q 19/10* (2013.01)

(58) Field of Classification Search
CPC ........ H01Q 1/002; H01Q 1/246; H01Q 1/526; H01Q 19/10; H01Q 21/0025; H01Q 21/0093; H01Q 21/30
See application file for complete search history.

(56) References Cited

U.S. PATENT DOCUMENTS 6,233,434 B1 5/2001 Takei
6,329,949 B1 12/2001 Barnett et al.
(Continued)

FOREIGN PATENT DOCUMENTS

CN 1639866 A 7/2005
CN 101924262 A 12/2010
(Continued)

OTHER PUBLICATIONS

Extended European Search Report for European Patent Application No. 19958070.5 dated Aug. 17, 2023, 10 pages.
(Continued)

*Primary Examiner* — Tung X Le
(74) *Attorney, Agent, or Firm* — Sage Patent Group

(57) ABSTRACT

An antenna unit for a base station is disclosed, comprising: a non-metal structural base; a metal pattern formed on a first side of the base and comprising a feeding network and radiator elements; and a metal layer formed on a second side opposite to the first side of the base and serving as a reflector. The metal layer is configured as an EMC cover for blocking or suppressing electromagnetic interference between the antenna unit and a radio unit electrically coupled to the antenna unit. An antenna module and a base station comprising the above-mentioned antenna unit are also disclosed.

16 Claims, 6 Drawing Sheets

(56) References Cited

U.S. PATENT DOCUMENTS

| | | | | |
|---|---|---|---|---|
| 11,322,836 | B2 | 5/2022 | Kim et al. | |
| 11,387,564 | B2 | 7/2022 | Kim et al. | |
| 2001/0018793 | A1* | 9/2001 | McKinnon | H01Q 9/285 343/907 |
| 2004/0001299 | A1 | 1/2004 | van Haaster et al. | |
| 2005/0174749 | A1 | 8/2005 | Liikamaa et al. | |
| 2005/0225411 | A1 | 10/2005 | Sauder et al. | |
| 2009/0153271 | A1 | 6/2009 | Park et al. | |
| 2011/0032158 | A1 | 2/2011 | Rodger et al. | |
| 2012/0098613 | A1 | 4/2012 | Han et al. | |
| 2012/0115548 | A1* | 5/2012 | Shimizu | H01Q 21/26 455/562.1 |
| 2012/0293279 | A1 | 11/2012 | Gong et al. | |
| 2016/0233567 | A1 | 8/2016 | Tong et al. | |
| 2017/0033468 | A1 | 2/2017 | Wong | |
| 2017/0098877 | A1 | 4/2017 | Purna et al. | |
| 2017/0256867 | A1 | 9/2017 | Ding et al. | |
| 2019/0103682 | A1* | 4/2019 | Thai | H01Q 9/28 |
| 2019/0268046 | A1 | 8/2019 | Kim et al. | |
| 2020/0287260 | A1 | 9/2020 | Kim et al. | |
| 2021/0143558 | A1* | 5/2021 | LeBlanc | H01Q 5/307 |
| 2021/0203078 | A1* | 7/2021 | Lin | H01Q 1/50 |
| 2021/0328365 | A1* | 10/2021 | Zhang | H01Q 21/065 |
| 2021/0359415 | A1* | 11/2021 | Takaki | H01Q 21/28 |
| 2022/0320743 | A1* | 10/2022 | Igarashi | H01Q 13/08 |

FOREIGN PATENT DOCUMENTS

| | | | |
|---|---|---|---|
| CN | 202585692 | U | 12/2012 |
| CN | 203503762 | U | 3/2014 |
| CN | 204793134 | U | 11/2015 |
| CN | 106165196 | A | 11/2016 |
| CN | 107171075 | A | 9/2017 |
| CN | 107221747 | A | 9/2017 |
| CN | 107706544 | A | 2/2018 |
| CN | 108461927 | A | 8/2018 |
| CN | 108767447 | A | 11/2018 |
| CN | 109301496 | A | 2/2019 |
| CN | 208939141 | U | 6/2019 |
| CN | 110011072 | A | 7/2019 |
| CN | 110165397 | A | 8/2019 |
| CN | 110380191 | A | 10/2019 |
| CN | 209948056 | U | 1/2020 |
| EP | 1133064 | B1 | 8/2002 |
| EP | 2270926 | A1 | 1/2011 |
| EP | 2894710 | A1 | 7/2015 |
| WO | 2014075457 | A1 | 5/2014 |
| WO | 2016202687 | A1 | 12/2016 |
| WO | 2019139281 | A1 | 7/2019 |
| WO | 2020153760 | A1 | 7/2020 |

OTHER PUBLICATIONS

International Search Report and Written Opinion of the International Searching Authority for PCT International Application No. PCT/CN2019/128767 dated Sep. 17, 2020.

Chinese Office Action for Chinese Patent Application No. 201980103313.0, dated Oct. 30, 2024, 7 pages.

Second Office Action mailed Jun. 24, 2025, Chinese Application No. 202080105627.7, 21 pages.

* cited by examiner

ANTENNA UNIT, ANTENNA MODULE AND BASE STATION HAVING THE SAME

CROSS REFERENCE TO RELATED APPLICATION

This application is a 35 U.S.C. § 371 national stage application of PCT International Application No. PCT/CN2019/128767 filed on Dec. 26, 2019, the disclosure and content of which is incorporated by reference herein in its entirety.

TECHNICAL FIELD

The present disclosure generally relates to the technical filed of communication device, and more particularly, to an antenna unit (AU), an antenna module and a base station (BS).

BACKGROUND

This section introduces aspects that may facilitate better understanding of the present disclosure. Accordingly, the statements of this section are to be read in this light and are not to be understood as admissions about what is in the prior art or what is not in the prior art.

Base station (BS) is an important part of a mobile communication system, and may include a radio unit (RU) and an antenna unit (AU). In traditional BS solution, remote radio unit (RRU) and AU are separated as two independently units and hung on high constructions, like tall buildings, high walls, towers and lamp stands. Considering the installation/fixation/occupation, smaller volume and lighter weight is always an important evolution direction in BS design.

Recent years, with the development of a mobile communication system, the demands for small size, light weight and high-performance antenna are growing rapidly. Many base station products, such as an advanced antenna system (AAS) base station, a Micro base station, a Street Micro base station, a Small cell base station, etc., integrated a radio unit into an antenna unit. The main method to reduce volume and weight for these products is to make each component size minimum.

In existing technology, as shown in FIGS. 1*a* and 1*b*, an EMC (electromagnetic compatibility) cover 30' is always desired for blocking or suppressing the interference between the radio unit 10' and the antenna unit 20'. For the antenna unit 20' itself, it consists of a metal reflector, a feeding network board in the form of micro-strip lines and radiator elements.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for reducing the size and weight of the base station and also reducing the assembly cost and the PIM levels.

According to a first aspect of the disclosure, there is provided an antenna unit for a base station, comprising: a non-metal structural base; a metal pattern formed on a first side of the base and comprising a feeding network and radiator elements; and a metal layer formed on a second side opposite to the first side of the base and serving as a reflector. The metal layer is configured as an electromagnetic compatibility (EMC) cover for blocking or suppressing electromagnetic interference between the antenna unit and a radio unit electrically coupled to the antenna unit.

In an embodiment of the disclosure, the base is made of plastic.

In an embodiment of the disclosure, the metal pattern and/or the metal layer are integrally formed on the base by a method of plating on plastic or a method of laser-direct-structuring.

In an embodiment of the disclosure, the base is made of ceramic.

In an embodiment of the disclosure, the metal pattern and/or the metal layer is/are integrally formed on the base by a co-firing method, a thick film technology, a thin film technology or a direct bonding method.

In an embodiment of the disclosure, the metal layer comprises a stack of a Cu sub-layer, a Ag sub-layer, a Sn sub-layer and a Ni sub-layer.

In an embodiment of the disclosure, the base is provided with holes for the passage of connectors which are configured to electrically couple the metal pattern and the radio unit.

According to a second aspect of the disclosure, there is provided an antenna module for a base station, comprising an antenna unit as mentioned in the above and a radio unit.

According to a third aspect of the disclosure, there is provided a base station, comprising an antenna module as mentioned in the above.

In an embodiment of the disclosure, the base station is a Legacy Base Station, a small cell base station, a Street Micro base station or an AAS base station.

According to the present disclosure, the total weight and the volume of the antenna module can be reduced greatly. Moreover, since the whole structure of the antenna module according to the present disclosure is simpler than that of the existing antenna module, the production efficiency, especially assembling efficiency, is improved a lot. Also, the cost is reduced because at least one reflector, one EMC cover, several connectors and fasten screws are saved than before. Due to the high integration, the PIM level in the antenna module is greatly reduced as well.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1A:
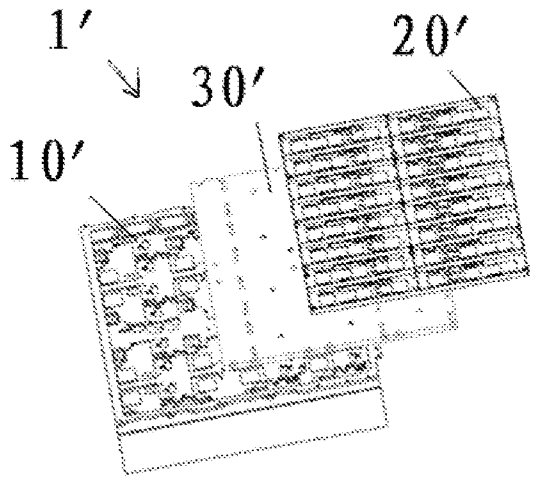
FIG. 1*a* and FIG. 1*b* show the top view and the bottom view of an existing antenna module comprising an antenna unit and a radio unit with an EMC cover being provided therebetween.
Figure 1B:
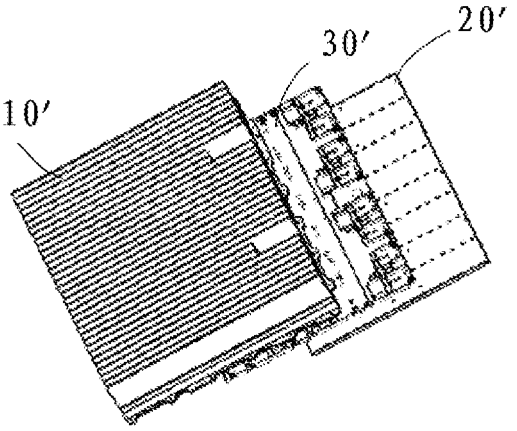

As is seen from FIGS. 1*a* and 1*b*, the structure of the existing antenna module 1' is very complicated and also has the disadvantage of high height (size) and weight.

Figure 2A:
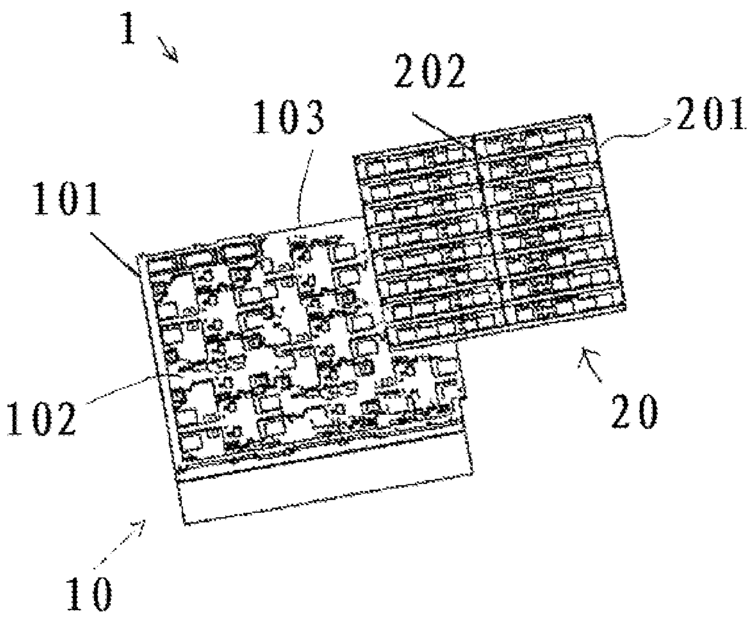
FIG. 2*a* and FIG. 2*b* show the top view and the bottom view of an antenna module according to an embodiment of the present disclosure, wherein the antenna module of the present embodiment comprises an antenna unit and a radio unit.
Figure 2B:
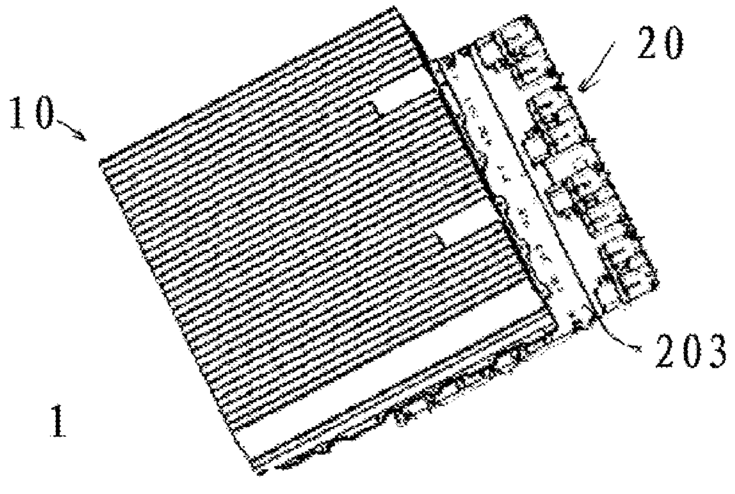

Additionally, since boards with high performance are needed inside the antenna unit 20' for making a feeding network structure and antenna calibration respectively, the cost is always very high. Also, since the antenna unit, the radio unit and the EMC cover are separated parts, the complexity of system building practice increases. The weight, size, assembly difficulty and the resulting cost of existing antenna module is very high as well. Also, the complicated structure doesn't suit for the applications which have very high passive inter-modulation (PIM) requirement. Referring to FIGS. 2*a* and 2*b*, the top and bottom exploded views of antenna module 1 of an embodiment of the present disclosure are shown to explain the improvements made over the prior art shown in FIGS. 1*a* and 1*b*. According to the embodiment, the antenna module 1 comprises a radio unit 10 and an antenna unit 20 which is placed on top of the radio unit 10 and connected to the radio unit 10 by connections.

In the antenna module 1 of an embodiment, the radio unit 10, which may function as a power amplifier and a transceiver, comprises a frame 101 and a radio board 102 placed in the frame 101 and supported thereby. As shown in FIG. 2*a*, the frame 101 is provided with a top opening 103 which opens towards the antenna unit 20.

Figure 3A:
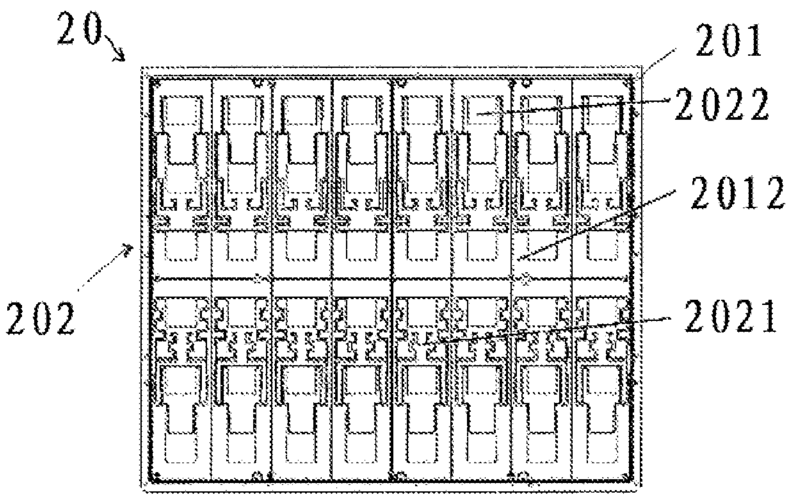
FIG. 3*a* and FIG. 3*b* show the top view and the bottom view of the antenna unit according to the embodiment shown in FIG. 2*a* and FIG. 2*b;*
Figure 3B:
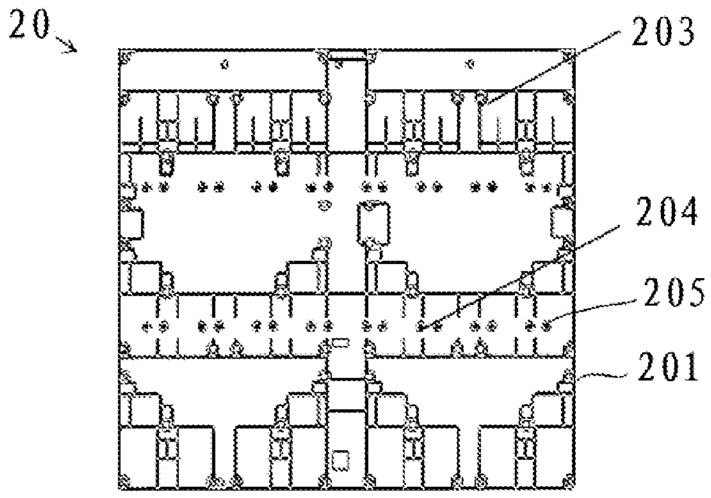

As shown in FIGS. 3*a* and 3*b*, the antenna unit 20 comprises a non-metal structural base 201, a metal pattern 202 formed on the first side (shown as a top side in FIG. 2*a*) of the base 201 and comprising a feeding network 2021 and radiator elements 2022 (for example, antenna oscillators), and a metal layer 203 formed on the second side (shown as a bottom side in FIG. 2*a*) opposite to the first side of the base 201. According to an embodiment of the disclosure, the first side of the base 201 may be a substantially planar surface. The second side of the base 201 may be integrally formed with relief structures intended to define cavities for devices/components provided on the radio board 102 of the radio unit 10. The metal layer 203 may be formed into a configuration following the relief structures of the base 201. The metal layer 203 functions as a reflector of the antenna unit 20 on one hand, and on the other hand is configured as an EMC(electromagnetic compatibility) cover closing the opening 103 of the radio unit 10 which is electrically coupled to the feeding network 2021 and the radiator elements 2022.

It can be easily understood that, the term "electrically coupled" means an electrical connection is realized either directly or indirectly, which allows transmission of the electric signal, and the terms "top" and "bottom" refers to the sides of the antenna unit when it is placed in a working position.

In a preferred embodiment, the non-metal structural base 201 is made of plastic. Preferably, it is formed into one piece, for example, by injection molding. The plastic material may be selected from the group consisting of PE (Polyethylene), PP (Polypropylene), PVC (Polyvinyl Chloride), PET (Polyethylene Terephthalate), PS (Polystyrene), PA (Polyamide), PPS (Polyphenylenesulfide), PC (Polycarbonates) or PI (Polyimide Film). For example, the plastic material can be in the form of LCP (liquid crystal polymer). The base can also be made of ceramic, glasses or other polymer materials. Since the materials for the base can be easily shaped by molding, higher consistency can be obtained for the base and also higher production efficiency can be achieved as compared with the process for the existing antenna unit with the conventional PCB (printed circuit broad) structure.

Radiator elements 2022 can be applied to the first side of the non-metal structural base 201 by a metallization process, for example, hot stamping, printing, coating, plating or adhesives or the like. In case the base is made of plastic, the method of plating on plastic or the method of laser-direct-structuring is highly preferable for forming the radiator elements on the base, because it can be performed easily with high efficiency. Additionally, it can help to reduce the volume of the antenna effectively, and has huge benefit in terms of cost, weight, size and production while without degradation on RF (radio frequency) performance. Moreover, since no extra snap joins or connections are needed for the mounting of the radiator elements 2022 on the base 201, the number of the components required for their assembling can be reduced and lower cost can be obtained as a result.

As part of the antenna unit 20 of an embodiment of the disclosure, the feeding network 2021 comprising a plurality of micro-strip lines is electrically coupled to the radiator elements 2022, making it possible to transmit the signal to be sent out by the feeding network 2021 to the radiator elements 2022 and the signal received by the radiator elements 2022 to the feeding network 2021. The feeding network 2021 can be applied to the top side of the base 201 by a metallization process, for example, hot stamping, printing, coating, plating or adhesives or the like. In case of a plastic base 201, the method of plating on plastic or the method of laser-direct-structuring is recommended for forming the feeding network 2021 on the base 201.

As part of the antenna unit of an embodiment of the disclosure, the metal layer 203 is formed on the second side of the base 201 by a metallization process, for example, hot stamping, printing, coating, plating or adhesives or the like. In case of a plastic base 201, the method of plating on plastic or the method of laser-direct-structuring is highly preferable for forming the metal layer 203 on the base 201, because, as mentioned in the above, the plating process or the laser-direct-structuring process can be easily performed on a plastic base with high efficiency, low cost and light weight while without degradation on RF performance. The metal material for the metal layer 203 can be selected from the group consisting of silver, copper, aluminum, gold, iron, manganese, titanium, chromium or the like.

In another preferred embodiment, the metal layer 203 comprises a stack of a Cu sublayer, a Ag sublayer, a Sn sublayer and a Ni sublayer. For example, the Sn sub-layer is deposited on the Cu sublayer coated on the base 201, and then the Ag and Ni sublayers are coated thereon. The metal layer 203 thus formed functions as a reflector to gather the antenna signal on the corresponding radiator elements, so as to enhance receiving ability of the antenna. Also, the metal layer 203 can be used to block or shield the interference signal from the back of the base 201, so as to avoid the antenna from being interfered when it is receiving an antenna signal.

It should be understood that, in case that the base is made of ceramic, the metal pattern and/or the metal layer can be integrally formed on the base by a co-firing method, a thick film technology, a thin film technology or a direct bonding method.

When the antenna unit 20 is mounted to the radio unit 10, the base 201 (particularly the metal layer 203) is placed on top of the opening 103 defined by the frame 101, as an EMC cover for the radio board 102 together with the frame 101 of the radio unit 10. Hence, as compared with the existing antenna module structure shown in FIG. 1a, the antenna module 1 of the present disclosure can function well without the need of providing an EMC cover separately. Also, the metal layer 203 formed on the second side of the base 201 can both work for the antenna as a reflector and serve as an EMC cover for blocking the interference between the radio unit and the antenna unit, providing better grounding for the antenna.

Figure 4A:
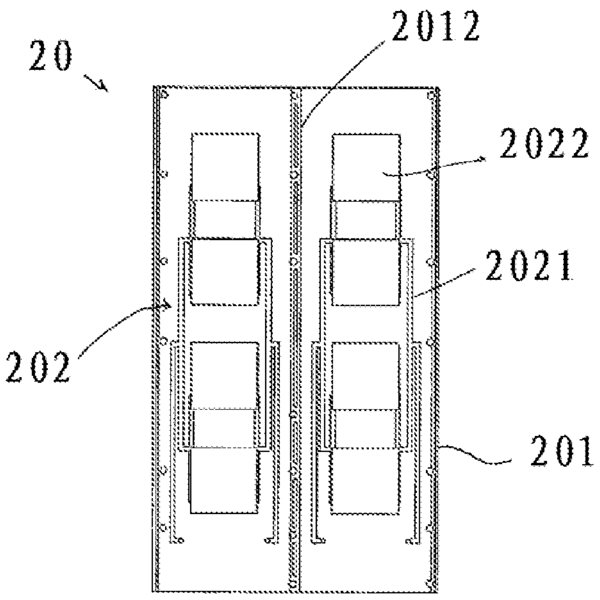
FIG. 4*a* and FIG. 4*b* show the top view and the bottom view of an antenna unit according to an embodiment of the present disclosure for small cell Base Station.
Figure 5A:
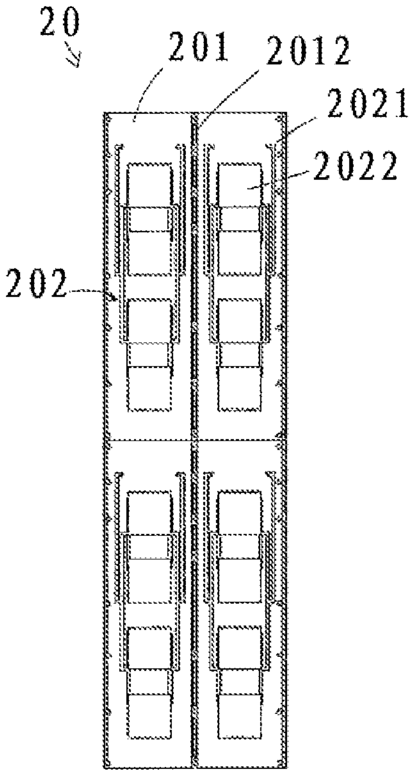
FIG. 5*a* and FIG. 5*b* show the top view and the bottom view of an antenna unit according to an embodiment of the present disclosure for Legacy Base Station.

FIGS. 3*a*, 4*a* and 5*a* show embodiments of the antenna unit 20 with antenna isolation bars 2012 provided on the base 201. Preferably, the antenna isolation bars 2012 are made integral with the base 201. The antenna isolation bars 2012 are provided between groups of the radiator elements 2022 on the base 201, such that mutual coupling effect between different groups of radiator elements can be reduced. As non-limitative examples, FIGS. 2*a*, 3*a*, 4*a* and 5*a* show different arrangements of antenna isolation bars 2012 for groups of radiator elements.

It should be understood that, the number, size and the arrangements of the radiator elements 2022 can vary according to the practical applications and different requirements. The arrangement of the antenna isolation bars 2012 can vary according to the change in the arrangement of the radiator elements.

Figure 4B:
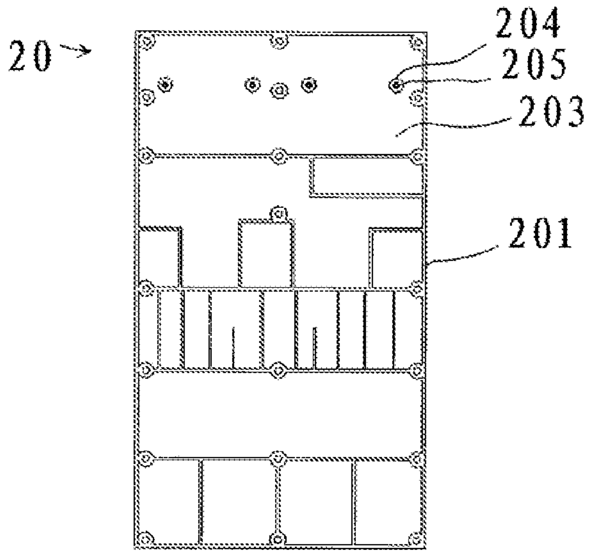
Figure 5B:
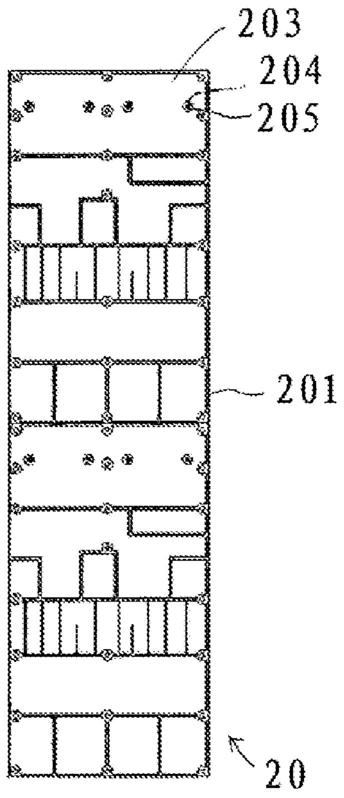
Figure 6A:
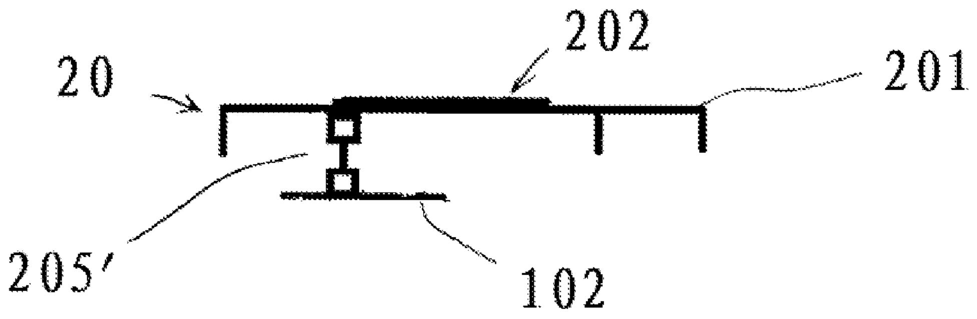
FIGS. 6*a*, 6*b* and 6*c* show the connections between a radio board and an antenna unit according to an embodiment of the present disclosure.
Figure 6B:
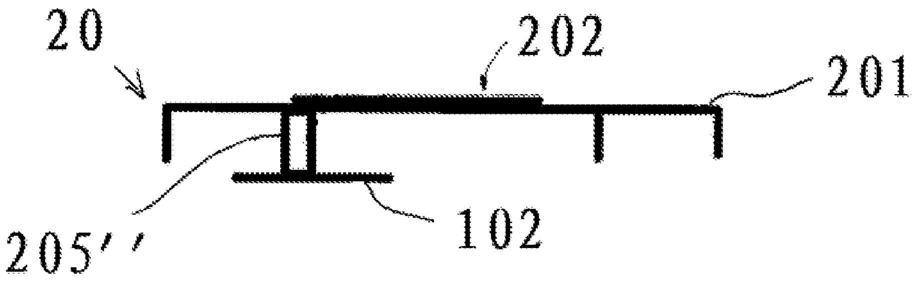
Figure 6C:
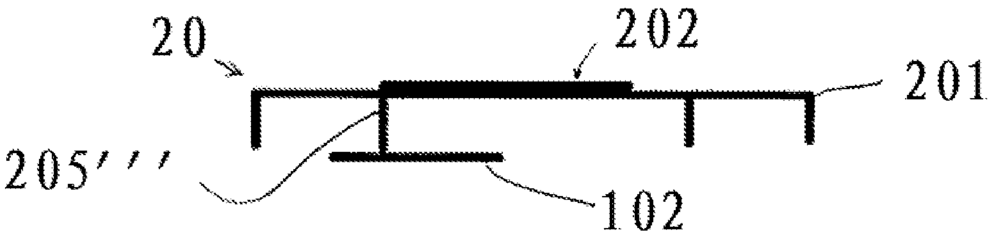

As shown in FIGS. 3*b*, 4*b* and 5*b*, the base 201 of the antenna unit 20 is provided with holes 204 for the passage of connectors 205 which are configured to electrically couple the metal pattern 202 with the radio unit 10 such that the signal from the radio board 102 to the antenna unit 20 can be routed through the connectors 205. The connectors can be embodied in the form of conventional connectors, for example, three-piece connector 205' (shown in FIG. 6*a*), one-piece connector 205" (shown in FIG. 6*b*) and a pin-connector 205'" (shown in FIG. 6*c*). Taking a pin connector as an example, it can be molded together with the non-metal structural base 201 of the antenna unit 20. By doing this, the whole structure of the antenna unit 20 can be made more compact and its assembly can be made easier. As a variant, a metalized hole can be formed in the base 201 for cooperating with the connectors to provide a signal path between the radio board 102 and the metal pattern 202 on the first side of the base 201.

According to the embodiments of the disclosure, once the antenna unit 20 is assembled with the radio unit 10, an EMC cover, which is supposed to be separately provided in an existing antenna module, is now substituted by the metal layer 203 of the antenna unit 20, which therefore enables integration of high degree and also fully making use of the space available with less components, reduced weight and cost. Additionally, the PIM performance can be greatly improved due to seamless connection between the metal pattern 202 and the metal layer 203 (i.e. the EMC cover), as well as reduction of connectors and screws required. Due to the high integration, and also since several standalone parts\connectors\fix screws are eliminated, the total BOM (bill of materials) cost is reduced as well.

It should be understood that, there is no limitation to the manufacturing method and the assembly method for the antenna module of the present disclosure. For example, as shown in FIGS. 2*a* and 2*b*, the antenna unit 20 of the present disclosure can be provided as a whole. Upon placing and mounting the antenna unit 20 onto the radio unit 10, a top opening 103 is covered and closed by the base 201 of the antenna unit 20, with the metal layer 203 being placed between the metal pattern 202 of the antenna unit and the radio board 102 of the radio unit. The metal layer 203 can then function as an EMC cover closing the frame 101 of the radio unit 10. Connectors 205 extend through the holes 204 to electrically couple the metal pattern 202 and the radio board 102 in a manner as predesigned in advance. The assembling process is very easy, and therefore the production efficiency can be greatly improved consequently.

The antenna unit of the present disclosure is applicable to a Legacy Base Station (LBS), a small cell base station, a Street Micro base station and an Advanced Antenna Systems (AAS) base station and so on. It should be understood that, the embodiments of the present disclosure can be applied to all kinds of base station for all kinds of communication system (including, but not limited to, 3G, 4G or 5G systems).

References in the present disclosure to “an embodiment”, “another embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An antenna unit for a base station, comprising:

a non-metal structural base;

a metal pattern formed on a first side of the base and comprising a feeding network and radiator elements; and a metal layer formed on a second side opposite to the first side of the base and serving as a reflector, wherein the metal layer is configured as an electromagnetic compatibility (EMC) cover for blocking or suppressing electromagnetic interference between the antenna unit and a radio unit electrically coupled to the antenna unit, wherein the metal layer comprises a stack of a Cu sublayer, a Ag sublayer, a Sn sublayer and a Ni sublayer.

2. The antenna unit according to claim 1, wherein the base is made of plastic.

3. The antenna unit according to claim 2, wherein the metal pattern and/or the metal layer is/are integrally formed on the base by a method of plating on plastic or a method of laser-direct-structuring.

4. The antenna unit according to claim 1, wherein the base is made of ceramic.

5. The antenna unit according to claim 4, wherein the metal pattern and/or the metal layer is/are integrally formed on the base by a co-firing method, a thick film technology, a thin film technology or a direct bonding method.

6. The antenna unit according to claim 1, wherein the base is provided with holes for the passage of connectors which are configured to electrically couple the metal pattern and the radio unit.

7. An antenna module for the base station, comprising the antenna unit according to claim 1 and the radio unit.

8. The base station comprising the antenna module according to claim 7.

9. The base station according to claim 8, wherein the base station is a small cell base station, a Street Micro base station or an AAS base station.

10. The antenna module according to claim 7, wherein the base is made of plastic or ceramic.

11. The base station according to claim 8, wherein the base is made of plastic or ceramic.

12. The base station according to claim 11, wherein the metal pattern and/or the metal layer is/are integrally formed on the base by a method of plating on plastic or a method of laser-direct-structuring, when the base is made of plastic or ceramic; and wherein the metal pattern and/or the metal layer is/are integrally formed on the base by a co-firing method, a thick film technology, a thin film technology or a direct bonding method, when the base is made of ceramic.

13. The base station according to claim 11, wherein the base is provided with holes for the passage of connectors which are configured to electrically couple the metal pattern and the radio unit.

14. The antenna unit according to claim 1, wherein the metal pattern and/or the metal layer is/are integrally formed on the base by a method of laser-direct-structuring.

15. The antenna unit according to claim 1, wherein the Sn sublayer is deposited on the Cu sublayer and the Ag and the Ni sublayers are coated thereon.

16. The antenna unit according to claim 1, wherein the metal pattern and/or the metal layer is/are integrally formed on the base by a co-firing method or a direct bonding method.

* * * * *